Oct. 18, 1960  B. T. BAYNE  2,956,627
REACTION JET PROPULSION SYSTEMS FOR MULTI-ENGINE AIRCRAFT
Filed Dec. 12, 1956  2 Sheets-Sheet 1

INVENTOR
BERTRAM T. BAYNE

BY
Watson, Cole, Grindle & Watson
ATTORNEYS

United States Patent Office 2,956,627
Patented Oct. 18, 1960

2,956,627

REACTION JET PROPULSION SYSTEMS FOR MULTI-ENGINE AIRCRAFT

Bertram Thomas Bayne, London, England, assignor to D. Napier & Son Limited, London, England, a British company Filed Dec. 12, 1956, Ser. No. 627,787

Claims priority, application Great Britain Dec. 14, 1955

3 Claims. (Cl. 170—135.4)

This invention relates to reaction jet propulsion systems for multi-engine aircraft, the term "engine" being used herein to mean a unit which produces gas at a pressure suitable for discharge from one or more nozzles as a reaction jet or jets, whether this gas be air, combustion products, or a mixture thereof, and whether or not a mechanical drive is also taken from the unit. The invention is primarily concerned with certain problems which arise in such propulsion systems where the gas streams delivered by two or more engines enter a common duct leading to the nozzle or nozzles. The invention is applicable more particularly, but not necessarily exclusively, to the propulsion of multi-engine helicopters of the kind having at least one rotor driven by the reaction from jets of gas discharged through nozzles at or near the tips of the rotor blades.

According to the present invention, in a reaction jet propulsion system for a multi-engine aircraft wherein the gas streams delivered by two or more engines enter a common duct leading to a nozzle or nozzles, an isolating valve is provided between each of the said engines and the common duct, the (or each) nozzle includes a device for adjusting it to either a large area condition or a small area condition, and automatic control mechanism is provided interconnecting the isolating valves and the nozzle-adjusting device or devices which in the event of unbalance in the speeds of the engines connected to the common duct automatically sets the isolating valve associated with the engine with a predetermined lower speed to isolate this engine from the common duct and sets the nozzle-adjusting device or devices in the small area condition.

Thus, in the event of unbalance of the speeds of the engines, for instance in the event of complete or partial failure of one of the engines, or if an engine is voluntarily shut down in flight for economy or other reasons, or when a shut-down engine is being started while another engine is already running, the engine with the lower speed is isolated from the common duct to prevent leakage of gas from the duct back through this engine, and the area of the nozzle or nozzles is reduced to suit the reduced quantity of gas delivered into the common duct from the remaining engine or engines.

In the case of jet-propelled helicopters it is desirable to provide the common duct with a blow-off valve the operating pressure of which is controlled in dependence on the speed of rotation of the helicopter rotor or some other regulating parameter of the gas flow in the rotor. This blow-off valve serves to "trim" the gas flow to suit new operating conditions when an engine has been isolated from the common duct.

The propulsion system preferably also includes manual control mechanism whereby the pilot can actuate any of the isolating valves at will to isolate any desired engine from the common duct and simultaneously set the nozzle-adjusting device or devices in the small area condition. This manual control mechanism may be provided in cases where the aircraft is designed to operate under certain conditions with less than all its engines in operation. The manual control mechanism is overridden by the automatic control mechanism in the event of unbalance in the speeds of the engines which are in effective operation.

The invention may be performed in various ways and one particular embodiment, applied to a multi-engine jet-propelled helicopter, will now be described by way of example with reference to the accompanying diagrammatic drawings, in which.

Figure 1:
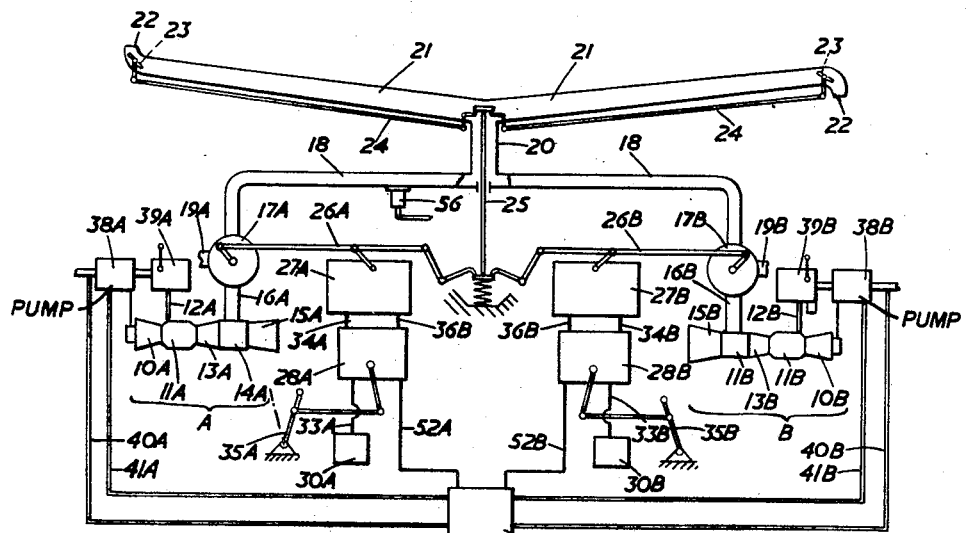
Figure 1 is a general block diagram of the working parts of the helicopter and its control system.

The multi-engine jet-propelled helicopter shown in the drawings has two gas turbine engines A and B. Parts that are identical for the two engines are designated with the same reference numeral, with the suffix A or B as the case may be. For brevity the invention will be described more particularly in relation to the engine A and its associated parts, and it will be understood that such description will be applicable also to the corresponding parts of engine B.

Figure 2:
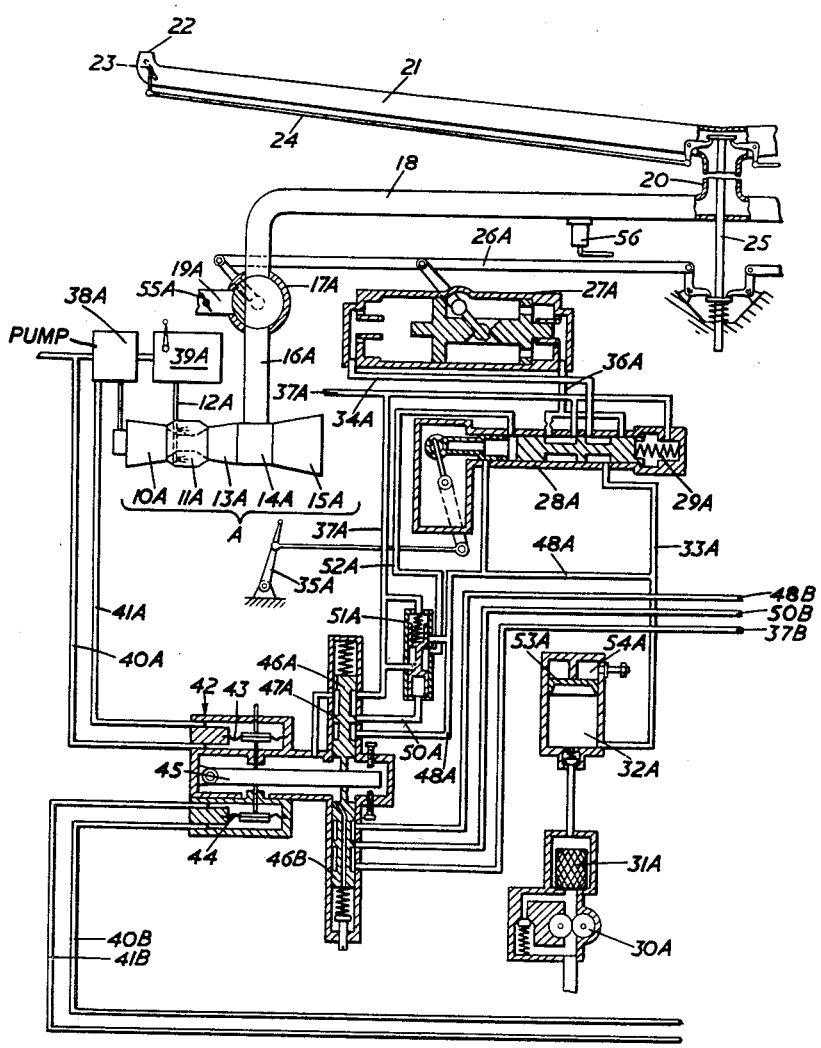
Figure 2 shows in more detail certain of the parts illustrated in Figure 1.

The engine A is a gas turbine engine having a main compressor 10A which draws in air from the atmosphere and delivers it into a combustion chamber or chambers 11A wherein is burnt fuel supplied through a pipe 12A. The hot combustion gases are expanded in a turbine 13A and then enter a mixing chamber 14A. The turbine 13A drives the main compressor 10A and also drives an auxiliary compressor 15A. The auxiliary compressor 15A draws in air from the atmosphere and discharges it into the mixing chamber 14A wherein it is mixed with the turbine exhaust gases. The mixed gases then pass through a pipe 16A to an isolating valve 17A and thence, depending upon the setting of the valve 17A, either into a duct 18 common to the two engines A and B or to the atmosphere through an outlet pipe 19A. The common duct 18 has an upwardly-extending trunk 20 leading to the hollow blades 21 of the helicopter rotor. Since the rotor is rotatable and the lower parts 18 of the common duct are stationary, the trunk 20 includes glands or seals (not shown) to permit relative rotation between its upper and lower parts without appreciable escape of gas. At the tip of each rotor blade 21 there is a discharge nozzle 22 directed rearwardly with respect to the rotor blade so that the reaction of the jet of gas discharged through the nozzle causes the helicopter rotor to rotate. Each nozzle 22 is provided with a device 23 for adjusting its flow cross-section either into a large area condition or a small area condition. These nozzle-adjusting devices are controlled through a linkage system 24 from a common actuating member 25 which is in turn connectable through linkage systems 26A and 26B to the isolating valves 17A and 17B and to servo motors 27A and 27B associated respectively with the engine A and the engine B. Considering the engine A, the linkage 26A not only serves to actuate the common actuating member 25 in response to movements of the servo motor 27A but also connects the isolating valve 17A with this servo motor, so that when the isolating valve 17A is in the normal position as shown in Figure 2 the nozzles 22 are in their large area condition whereas when the isolating valve 17A is in the isolating position, that is to say when the pipe 16A is connected to the outlet pipe 19A so that the engine A is isolated from the common duct 18, the nozzles are in the small area condition. Both the linkages 26A and 26B influence the common actuating member 25 so that the nozzles 22 are set into their small area condition whenever either the valve 17A or the valve 17B is turned into its isolating position.

The position of the servo motor 27A is determined by the position of a main shuttle valve 28A, this valve being normally urged to the left in Figure 2 by a spring 29A so that hydaulic fluid which is maintained under pressure by a pump 30A is in communication through a filter 31A, a hydraulic pressure accumulator 32A and pipes 33A and 34A with the left-hand cylinder space of the servo motor 27A whereby the piston of this servo motor is urged to the right to hold the isolating valve 17A in its normal position as show in the drawing. For the engine A there is a control lever 35A which can be actuated by the pilot to move the shuttle valve 28A to the right against the action of the spring 29A for cutting off communication between the pipes 33A and 34A and opening communication between the pipe 33A and a pipe 36A leading to the right-hand end of the servo motor 27A. At the same time the pipe 34A is brought into communication with a drain pipe 37A. Thus, by moving the control lever 35A so as to force the shuttle valve 28A to the right, the pilot can at will actuate the isolating valve 17A to isolate the engine A from the common duct 18 and simultaneously set the rotor nozzles 22 into their small area condition. On the other hand, when the shuttle valve 28A is held in its right-hand end position by hydraulic pressure in a manner to be described, the control 35A is inoperative to return the shuttle valve 28A towards the left. Thus although the pilot can at will isolate either engine from the common duct, he cannot connect an engine to the common duct unless the automatic control system is in a condition permitting this.

Fuel from the engine A is pumped by an engine-driven fuel pump 38A to a fuel metering unit 39A and thence to the combustion chambers 11A through the pipe 12A. The fuel pump 38A is of the kind which produces a pressure differential between a low pressure pipe (pump inlet pressure) 40A and a high pressure pipe (inlet pressure plus centrifugal head) 41A. These pressures and the corresponding pressures from the engine B are supplied to a device 42 sensitive to any unbalance between the pressure differences on the one head in the pipes 41A and 40A and on the other hand in the pipes 41B and 40B, that is to say the device 42 constitutes a differential speed-sensing device for the two engines.

The differential speed-sensing device 42 is shown in more detail in Figure 2. It comprises an upper diaphragm 43 across which is applied the pressure difference between the pipes 41A and 40A, and a lower diaphragm 44 across which is applied the pressure difference between the pipes 41B and 40B. The diaphragms 43 and 44 act through pins in opposite directions upon a lever 45. This lever is pivoted at its left-hand end as shown in Figure 2, and near its right-hand end it is engaged between an upper trigger valve 46A and a lower trigger valve 46B. These valves are loaded by springs which tend to maintain the lever 45 in an equilibrium position, and it will remain in this equilibrium position when the resultant forces acting upon the diaphragms 43 and 44 are balanced.

Considering the trigger valve 46A, this is provided with a central land 47A the space beneath which communicates with a pipe 48A which in turn communicates with the pipe 33A and is therefore continually supplied with hydraulic fluid under pressure. The land 47A normally obstructs the entrance to a pipe 50A leading to the underside of an auxiliary shuttle valve 51A.

Should the speed of the engine A fall below that of the engine B, the pressure difference between the pipes 41A and 40A will decrease, thereby reducing the resultant downward force upon the diaphragm 43 and causing the lever 45 to be swung upwards. This raises the trigger valve 46A, and when it has been raised but a short distance the pipe 48A is brought into communication with the pipe 50A, thereby raising the auxiliary shuttle valve 51A. The raising of this valve immediately establishes communication between the pipe 48A and a pipe 52A which leads to the left-hand side of the main shuttle valve 28A. Since the pipe 48A contains and is supplied with fluid under pressure, the main shuttle valve 28A is forced to the right, thereby causing the piston of the servo motor 27A to move to the left as previously described, to isolate the engine A from the common duct 18 and set the nozzles 22 in the small area condition. The shuttle valves 51A and 28A ensure that the changeover of the servo motor 27A from one end position to the other is effected sharply and prevent indecisive movements of the servo motor.

The function of the accumulator 32A, which consists of a vessel containing a piston 53A with a compressed air space 54A above it, is to contain beneath the piston 53A sufficient fluid under pressure to fill the servo motor when the piston thereof moves from one end position to the other, to ensure a rapid change-over without requiring an excessively large pump 30A.

The lower trigger valve 46B communicates with corresponding parts associated with the engine B through pipes 48B, 50B and 37B.

When an engine, for instance the engine A, has been isolated from the common duct 18 by actuation of the servo motor 27A, either manually by the control lever 35A or automatically by the differential speed-sensing device 42, the gas that continues to be delivered by the engine A will be discharged to the atmosphere through the outlet pipe 19A. This pipe includes a throttle valve 55A which is adjusted so that the resistance to the flow of the gas emerging through the outlet pipe 19A is approximately the same as the resistance to the flow of the gas through the common duct 18, the rotor blades 21 and the nozzles 22. Thus, the movements of the isolating valve 17A do not significantly affect the back pressure against the gas discharged from the engine. This has the advantage that if, for instance, the engine B is already running connected to the common duct 18 and the engine A is started with the isolating valve 17A in its isolating position and when the engine A has been run up to the same speed as the engine B the isolating valve 17A is turned to its normal position, virtually no shock or suddenly increased load is imposed upon the engine A. Conversely, when an engine is disconnected from the common duct there is no sudden reduction in load which might cause it to overspeed.

The discharge opening of the outlet pipe 19A is so disposed that the gas discharged from it does not produce an unwanted couple on the aircraft. For instance, the opening may face vertically upwards or downwards.

Figure 3:
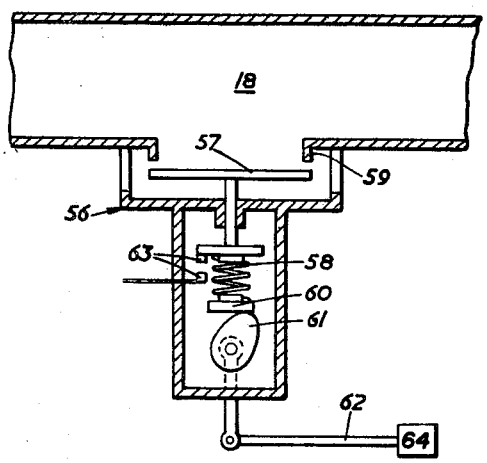
Figure 3 shows the construction of the blow-off valve.

Communicating with the common duct 18 there is a blow-off valve 56 that is shown in more detail in Figure 3. This valve includes a closure member 57 which is urged by a spring 58 towards its closed position in which it seats on a seating 59. Should the pressure in the common duct 18, and acting on the closure member 57, exceed the force exerted by the spring 58, the blow-off valve will open, permitting gas to blow off from the common duct 18 to the atmosphere. The purpose of the blow-off valve is to "trim off" surplus gas when more gas is being introduced into the common duct than is being discharged through the nozzles 22 in the prevailing conditions. For instance, should the engine A fail and be automatically isolated from the common duct by operation of the isolating valve 17A, the nozzles 22 will be set in the small area condition and the engine B may be adjusted to produce a higher output. The rotor speed, however, may have fallen temporarily below that appropriate to the new conditions. Until the rotor speed has been restored to the appropriate value, it will be desirable to blow off some of the gas from the common duct 18 in order to prevent the build-up of an undesirably high pressure therein. For this purpose the loading of the spring 58 is made dependent upon the speed of rotation of the rotor, having a movable abutment 60 the position of which is adjusted through a cam 61 and a linkage 62 from a conventional speed-sensing device 64 sensitive to the rotor speed.

The blow-off valve 56 may also be arranged to assist the matching of the rotor and the engines so that optimum overall performance is obtained. For example, it may be arranged to open at the upper end of the gas pressure range when both engines are supplying the common duct 18 and the nozzles 22 are in their large area condition, to trim the gas flow to suit the prevailing nozzle characteristics.

The blow-off valve is provided with a warning device including electrical contacts 63 connected in the circuit of a warning light in the pilot's cockpit, to indicate to the pilot that the blow-off valve has opened and so warn him that the engines are running in a wasteful manner.

What I claim as my invention and desire to secure by Letters Patent is:

1. A reaction jet propulsion system for an aircraft comprising at least two engines, gas discharge ducts from said engines, a common duct with which said discharge ducts communicate, at least one propulsion nozzle associated with said common duct, an isolating valve in each of said discharge ducts having a normal position in which the associated engine is connected to said common duct and an isolating position in which said associated engine is isolated from said common duct, a nozzle area adjusting device, servo control mechanism sensitive to an unbalance in the speeds of said engines and connections between said servo control mechanism and said isolating valves for closing the isolating valve of whichever of said engines may suffer a predetermined reduction in speed below that of the other engine to thereby isolate the engine that has suffered said speed reduction, connections between said isolating valves and said nozzle area adjusting device adapted to set said nozzle area adjusting device in a small nozzle area condition in the event of movement of any of said isolating valves into its isolating position, a blow-off valve communicating with said common duct and having a movable closure member, and spring means acting on said closure member in opposition to gas pressure in said common duct, and means for adjusting the initial loading of said spring means.

2. A reaction jet propulsion system for a helicopter comprising at least two engines, gas discharge ducts from said engines, a common duct with which said discharge ducts communicate, a rotor with hollow blades communicating with said common duct, rotor propulsion nozzles adjacent the tips of said rotor blades, an isolating valve in each of said discharge ducts having a normal position in which the associated engine is connected to said common duct and an isolating position in which said associated engine is isolated from said common duct, nozzle area adjusting devices, servo control mechanism sensitive to an unbalance in the speeds of said engines and connections between said servo control mechanism and said isolating valves adapted to move into said isolating position the isolating valve of an engine suffering a predetermined speed reduction below that of the other engine, connections between said isolating valves and said nozzle area adjusted devices adapted to set said nozzle area adjusting devices in a small nozzle area condition in the event of movement of any of said isolating valves into its isolating position, a blow-off valve communicating with said common duct and having a movable closure member, and spring means acting on said closure member in opposition to gas pressure in said common duct, and means for adjusting the initial loading of said spring means.

3. A reaction jet propulsion system according to claim 2 including a device sensitive to the speed of rotation of said rotor and a connection between said device and said adjusting means for the blow-off valve spring loading.

References Cited in the file of this patent

UNITED STATES PATENTS

| | | |
|---|---|---|
| 2,650,666 | Dorand et al. | Sept. 1, 1953 |
| 2,663,141 | Hage | Dec. 22, 1953 |
| 2,707,865 | Huebner | May 10, 1955 |
| 2,865,176 | Skellern | Dec. 23, 1958 |